(12) United States Patent
Yamada et al.

(10) Patent No.: US 10,224,126 B2
(45) Date of Patent: Mar. 5, 2019

(54) TRANSPARENT CONDUCTOR, METHOD FOR PRODUCING TRANSPARENT CONDUCTOR, AND TOUCH PANEL

(71) Applicant: Sharp Kabushiki Kaisha, Sakai, Osaka (JP)

(72) Inventors: Nobuaki Yamada, Sakai (JP); Kenichiro Nakamatsu, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 11 days.

(21) Appl. No.: 15/516,137

(22) PCT Filed: Sep. 30, 2015

(86) PCT No.: PCT/JP2015/077645
§ 371 (c)(1),
(2) Date: Mar. 31, 2017

(87) PCT Pub. No.: WO2016/056434
PCT Pub. Date: Apr. 14, 2016

(65) Prior Publication Data
US 2017/0309364 A1  Oct. 26, 2017

(30) Foreign Application Priority Data
Oct. 7, 2014 (JP) ................................ 2014-206551

(51) Int. Cl.
*H01B 1/22* (2006.01)
*G02B 1/118* (2015.01)
(Continued)

(52) U.S. Cl.
CPC ............... *H01B 1/22* (2013.01); *G02B 1/118* (2013.01); *G06F 3/041* (2013.01); *G06F 3/044* (2013.01);
(Continued)

(58) Field of Classification Search
None
See application file for complete search history.

(56) References Cited

U.S. PATENT DOCUMENTS

| 4,785,217 A | 11/1988 | Matsuda et al. |
| 2010/0147577 A1* | 6/2010 | Tanaka ................ H05K 9/0083 174/350 |

(Continued)

FOREIGN PATENT DOCUMENTS

| JP | S63-160140 A | 7/1988 |
| JP | H09055175 A | 2/1997 |

(Continued)

OTHER PUBLICATIONS

International Search Report PCT/ISA/210 for International Application No. PCT/JP2015/077645 Dated Dec. 15, 2015.

*Primary Examiner* — Kenneth B Lee, Jr.
(74) *Attorney, Agent, or Firm* — Harness, Dickey & Pierce, P.L.C.

(57) ABSTRACT

The present invention provides a transparent conductor that is excellent in conductivity, transparency, and low-reflection property and does not cause defects such as a moiré pattern; and a touch panel including the transparent conductor. The transparent conductor of the present invention includes an anti-reflection film provided on a surface with projections formed at a pitch equal to or shorter than the wavelength of visible light; and metal fine particles each having a particle size equal to or smaller than the pitch of the projections and being placed in bottom portions of gaps between the projections, the metal fine particles placed in the gaps between the projections constituting mesh conductive portions. The touch panel of the present invention includes the above transparent conductor.

15 Claims, 5 Drawing Sheets

(51) Int. Cl.
*G06F 3/041* (2006.01)
*H01B 13/30* (2006.01)
*G06F 3/044* (2006.01)

(52) U.S. Cl.
CPC ... *H01B 13/30* (2013.01); *G06F 2203/04103* (2013.01); *G06F 2203/04112* (2013.01)

(56) References Cited

U.S. PATENT DOCUMENTS

| | | | |
|---|---|---|---|
| 2012/0147472 A1* | 6/2012 | Kajiya | B32B 3/30 359/601 |
| 2012/0160560 A1 | 6/2012 | Kajiya et al. | |
| 2014/0210490 A1 | 7/2014 | Hayakawa et al. | |

FOREIGN PATENT DOCUMENTS

| | | |
|---|---|---|
| JP | H11026980 A | 1/1999 |
| JP | 2003/046293 A | 2/2003 |
| JP | 2003/109435 A | 4/2003 |
| JP | 2004-259640 A | 9/2004 |
| JP | 2007/322767 A | 12/2007 |
| JP | 2008/041445 A | 2/2008 |
| JP | 2008/122435 A | 5/2008 |
| JP | 2008/218860 A | 9/2008 |
| JP | 2008/283100 A | 11/2008 |
| JP | 4332610 B2 | 9/2009 |
| JP | 2009/224078 A | 10/2009 |
| JP | 2009/263700 A | 11/2009 |
| JP | 2010/093040 A | 4/2010 |
| JP | 2010/093239 A | 4/2010 |
| JP | 4626721 B1 | 2/2011 |
| JP | 5082357 B2 | 11/2012 |
| JP | 2013/178550 A | 9/2013 |
| JP | 2013/211108 A | 10/2013 |
| JP | 5332186 B2 | 11/2013 |
| JP | 5469849 B2 | 4/2014 |
| JP | 2014/092584 A | 5/2014 |
| WO | WO-2007/114076 A1 | 10/2007 |
| WO | WO-2013/129092 A1 | 9/2013 |

* cited by examiner (a)

(b)

(c)

(d)

TRANSPARENT CONDUCTOR, METHOD FOR PRODUCING TRANSPARENT CONDUCTOR, AND TOUCH PANEL

TECHNICAL FIELD

The present invention relates to transparent conductors, methods for producing a transparent conductor, and touch panels. More specifically, the present invention relates to a transparent conductor suitable for products such as touch panels in the display field, a method for producing the above transparent conductor, and a touch panel including the above transparent conductor.

BACKGROUND ART

Transparent conductors have been used mainly as transparent electrodes in touch panels in the display field, for example. Widely used typical transparent conductors are transparent films such as indium tin oxide (ITO) films. The ITO films, however, have the following problems (1) to (4), for example.
(1) Uneven thickness of an ITO film causes interference of light components reflected on the front and back surfaces of the ITO film, producing tinged reflected light.
(2) An ITO film has a high reflectance because of its refractive index of about 1.9 to 2.0 which is greatly different from the refractive index of the air layer.
(3) In the case of using multiple ITO films in a product such as a touch panel, the films decrease the transmittance (transparency) of the product.
(4) Indium, the major ingredient, of an ITO film, is a minor metal and may be depleted.

In order to deal with these problems, Patent Literatures 1 to 16, for example, suggest replacement of ITO films with transparent conductors such as ones obtained by placing metal fine particles in a pattern or ones obtained by patterning a metal thin film. These configurations are described to have transparency (light transparency) attributed to the opening regions in the transparent conductors as well as the conductivity attributed to the transparent conductors.

Also, configurations have been suggested in which a transparent film such as an ITO film is formed on an anti-reflection film having a moth-eye structure, a kind of a nanometer-sized projection recess structure (nanostructure), (for example, see Patent Literature 17). These configurations are described to have a low-reflection property attributed to the moth-eye structure as well as the conductivity attributed to the ITO film. In addition, for purposes other than forming transparent conductors, configurations with anti-fouling properties (for example, see Patent Literature 18) and configurations having water repellency (for example, see Patent Literature 19), as well as the low-reflection property attributed to the moth-eye structure, have been suggested.

CITATION LIST

Patent Literature

Patent Literature 1: JP 2009-224078 A
Patent Literature 2: JP S63-160140 A
Patent Literature 3: JP H9-55175 A.
Patent Literature 4: JP 4332610 B
Patent Literature 5: JP 5332186 B
Patent Literature 6: JP 2003-46293 A
Patent Literature 7: JP H11-26980 A
Patent Literature 8: WO 2007/114076
Patent Literature 9: JP 5082357 B
Patent Literature 10: JP 2010-93239 A
Patent Literature 11: JP 2008-283100 A
Patent Literature 12: JP 2008-218860 A
Patent Literature 13: JP 2003-109435 A
Patent Literature 14: JP 2010-93040 A
Patent Literature 15: JP 2009-263700 A
Patent Literature 16: JP 5469849 B
Patent Literature 17: JP 4626721 B
Patent Literature 18: JP 2007-322767 A
Patent Literature 19: JP 2008-122435 A

SUMMARY OF INVENTION

Technical Problem

Conventional transparent conductors, however, are insufficient in the conductivity, transparency, and low-reflection property, and may exhibit deteriorated quality because of generation of a defect such as a moiré pattern.

Patent Literature 1 discloses a transparent conductor obtained by placing metal fine particles in a pattern. The invention disclosed in Patent Literature 1, however, has the following problems (A) to (D), and can still be improved. Patent Literatures 2 to 5 have the same problems.
(A) The conductive portions in a mesh structure cannot be formed at a pitch shorter than the micrometer-sized pitch. In the case that such conductive portions are used in a display device, the mesh structure and the pixel pattern (micrometer-sized grid structure) of the display elements interfere with each other to produce a moiré pattern.
(B) Since the metal fine particles tend to accumulate in the ring patterns, the amount of the metal fine particles decreases in portions connecting the ring patterns to increase the chances of conduction failure. This increases the resistivity of all the conductive portions, decreasing the conductivity.
(C) The conductive portions, constituting projections on the substrate, easily come off under external force and thus have low durability.
(D) The conductor has a configuration including the mesh conductive portions on the transparent substrate, and therefore does not have the low-reflection property.

Patent Literature 6 discloses a method for forming conductive portions by patterning a metal thin film on a transparent substrate. The invention disclosed in Patent Literature 6, however, has the following problems (E) to (H), and can still be improved. Patent Literature 7 has the same problems.
(E) The conductive portions are formed at a micrometer-sized pitch by patterning. In the case that such conductive portions are used in a display device, the conductive portion pattern and the pixel pattern (micrometer-sized grid structure) of the display elements interfere with each other to produce a moiré pattern.
(F) Since jointed photomasks of a given size are used in patterning, the joints between the photomasks are likely to be perceived as unevenness, giving deteriorated quality to the conductor.
(G) The conductive portions, constituting projections on the transparent substrate, easily come off under external force and thus have low durability.
(H) The conductor has a configuration including a patterned metal thin film on the transparent substrate, and therefore does not have the low-reflection property.

Patent Literature 8 discloses a transparent conductor obtained by placing metal fine particles in a pattern. The invention disclosed in Patent Literature 8, however, has the following problems (I) to (K), and can still be improved. Patent Literatures 9 to 16 have the same problems.

(I) Since the conductive portions are formed utilizing phase separation on the substrate, the surface condition of the substrate needs to be maintained uniform, which makes the process control difficult. On a surface of the substrate whose condition is changed by factors such as stains, scratches, or foreign substances, metal fine particles are not distributed uniformly and increase the pitch (micrometer-sized) of the mesh at some parts, which may be perceived as roughness.

(J) The conductive portions, constituting projections on the substrate, easily come off under external force and thus have low durability. Also, in the method of forming conductive portions by applying a solution of metal fine particles, a binder, and a solvent to a substrate and causing phase separation in the drying step, the conductive portions are vulnerable to external force because the contact between the metal fine particles and the substrate is achieved by just a small amount of the binder.

(K) The conductor has a configuration including mesh conductive portions on the substrate, and therefore does not have a low-reflection property.

Patent Literature 17 discloses a transparent conductor including a transparent film such as an ITO film on an anti-reflection film having a moth-eye structure. The invention disclosed in Patent Literature 17, however, can still be improved because it utilizes a transparent film such as an ITO film and therefore has the above problems (1) to (4).

Patent Literature 18 discloses a configuration in which nanoparticles with a given refractive index are placed in gaps between projections constituting a moth-eye structure. The invention disclosed in Patent Literature 18, however, can still be improved because the invention is not intended to be used for formation of a transparent conductor and also has the following problems (L) and (M).

(L) The conductor has a high reflectance because the refractive index of the gaps between the projections constituting the moth-eye structure is higher than that of the air.

(M) The nanoparticles are transparent particles such as silica particles, not metal fine particles, and therefore have insufficient conductivity.

Similarly, the invention disclosed in Patent Literature 19 is not intended to form a transparent conductor, and therefore has insufficient conductivity.

The present, invention has been made in view of the above current state of the art, and aims to provide a transparent conductor that is excellent in conductivity, transparency, and low-reflection property and does not cause defects such as a moiré pattern; a method for producing the transparent conductor; and a touch panel including the transparent conductor.

Solution to Problem

The inventors of the present invention have made various studies on transparent conductors that are excellent in conductivity, transparency, and low-reflection property and do not cause defects such as a moiré pattern. The inventors have then focused on a configuration including an anti-reflection film having a moth-eye structure and metal fine particles in combination. As a result, they have arrived at forming mesh conductive portions by placing metal fine particles in the bottom portions of the gaps between projections constituting a moth-eye structure. Such a transparent conductor has been found to exhibit excellent conductivity with the mesh conductive portions formed by the metal fine particles, excellent transparency (light transparency) with the regions in which metal fine particles are not placed, and an excellent low-reflection property with the anti-reflection film having a moth-eye structure. The inventors have also found that such a configuration can prevent deterioration of the quality due to defects such as a moiré pattern. Thereby, the inventors have arrived at a solution of the above problems, completing the present invention.

One aspect of the present invention may be a transparent conductor including: an anti-reflection film provided on a surface with projections formed at a pitch equal to or shorter than the wavelength of visible light; and metal fine particles each having a particle size equal to or smaller than the pitch of the projections and being placed in bottom portions of gaps between the projections, the metal fine particles placed in the gaps between the projections constituting mesh conductive portions.

Another aspect of the present invention may be a method for producing the above transparent conductor, including the steps of: (1) applying a dispersion with the metal fine particles dispersed in a solvent to the anti-reflection film; (2) drying the applied dispersion to evaporate the solvent; and (3) heating the dried dispersion.

Yet another aspect of the present invention may be a touch panel including the above transparent conductor.

Advantageous Effects of Invention

The present invention can provide a transparent conductor that is excellent in conductivity, transparency, and low-reflection property and does not cause defects such as a moiré pattern; a method for producing the above transparent conductor; and a touch panel including the above transparent conductor.

DESCRIPTION OF EMBODIMENTS

The present invention is described in more detail based on embodiments (examples) with reference to the drawings. The embodiments (examples), however, are not intended to limit the scope of the present invention. Also, the configurations of the embodiments (examples) may appropriately be combined or modified within the spirit of the present invention.

Embodiment 1

Embodiment 1 relates to a transparent conductor including an anti-reflection film and metal fine particles.

(1) Structure of Transparent Conductor

Figure 1:
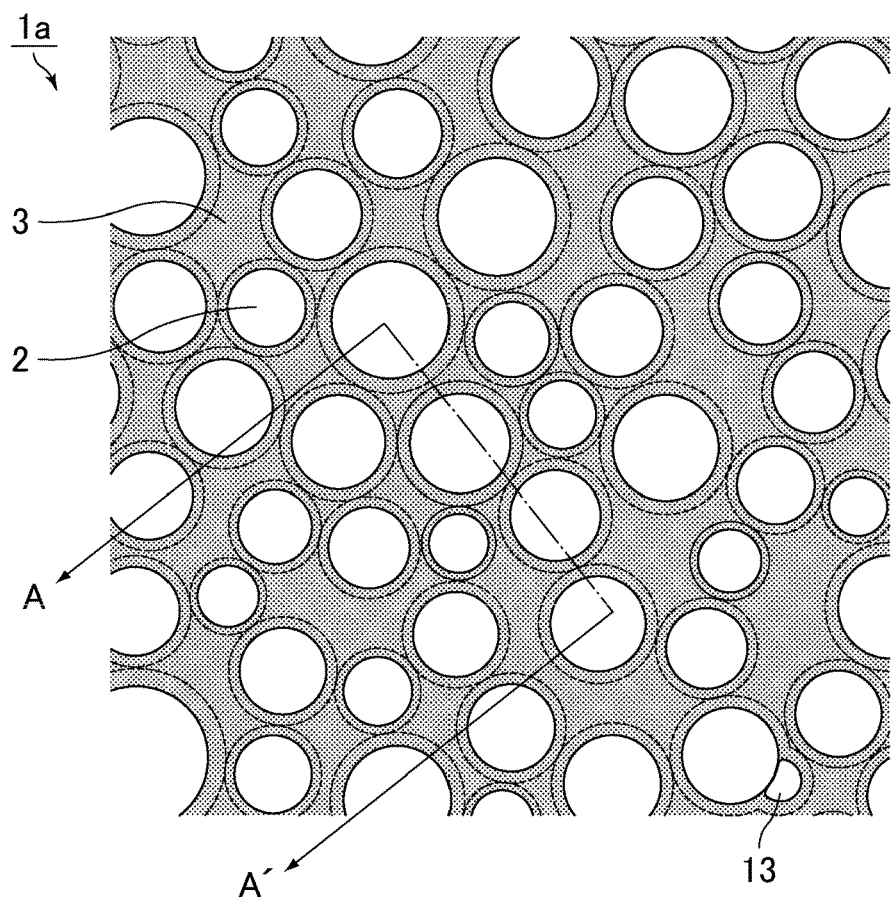
FIG. 1 is a schematic plan view of a transparent conductor of Embodiment 1.
Figure 2:
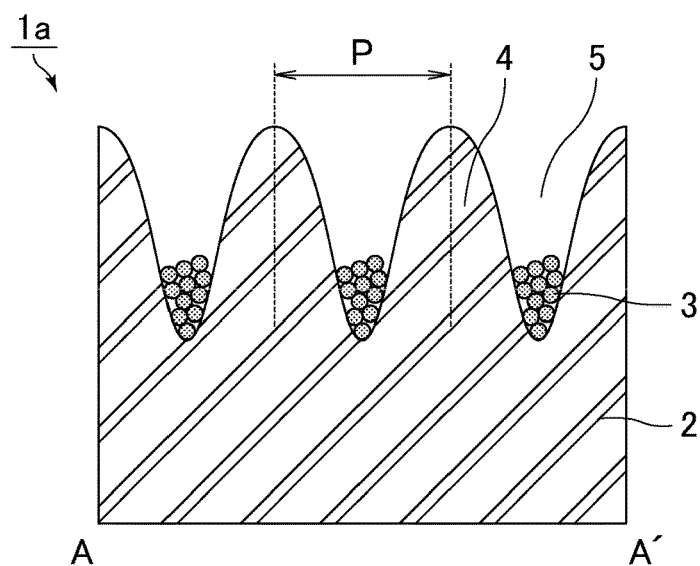
FIG. 2 is a schematic cross-sectional view of a cross section taken along the line A-A' in FIG. 1.

The structure of the transparent conductor of Embodiment 1 is described with reference to FIG. 1 and FIG. 2. FIG. 1 is a schematic plan view of a transparent conductor of Embodiment 1. FIG. 2 is a schematic cross-sectional view of a cross section taken along the line A-A' in FIG. 1. As illustrated in FIG. 1 and FIG. 2, a transparent conductor 1a includes an anti-reflection film 2 and metal fine particles 3. The anti-reflection film 2 corresponds to an anti-reflection film provided on the surface with projections (protrusions) 4 formed at a pitch (distance between the tops of each two adjacent projections 4) P equal to or shorter than the wavelength of visible light, i.e., an anti-reflection film having a moth-eye structure. The metal fine particles 3 each have a particle size equal to or smaller than the pitch P of the projections 4 constituting the moth-eye structure, and are placed in the bottom portions of gaps 5 between the projections 4, constituting mesh conductive portions. The bottom portions of the gaps 5 between the projections 4 as used herein mean the positions in the range of 0% to 50% of the depth of the gaps 5 between the projections 4. FIG. 1 and FIG. 2 each clearly illustrate the moth-eye structure and the mesh conductive portions (metal fine particles 3) in an enlarged view. In the actual transparent conductor 1a, the projections 4 and the metal fine particles 3 are significantly small. (smaller than the wavelength of visible light) relative to the area of the transparent conductor 1a. The moth-eye structure and the mesh conductive portions (metal fine particles 3) therefore cannot be identified as illustrated in FIG. 1 and FIG. 2 by the naked eye or with an optical device such as an optical microscope.

The projections 4 may each have any shape that tapers toward the end. Examples of the shape include shapes formed by a pillar-shaped bottom portion and a hemispherical top portion (hereinafter, also referred to as bell shapes) and conical shapes (cone shapes, circular cone shapes). Also, the projections 4 may have a shape with branched projections. The branched projections refer to projections formed at an irregular pitch in the anodizing and etching for formation of a moth-eye structure, such as the projections (branched projections 13) illustrated in FIG. 1. In order to form larger regions without the metal fine particles 3 and achieve higher transparency, the projections 4 each preferably have a bell shape thickening toward the bottom to give a narrow bottom portion to the gaps 5 between the projections 4 as illustrated in FIG. 2. Although the bottoms of the gaps 5 between the projections 4 each are curved in FIG. 2, the bottoms may each form a horizontal line without curvature. Also, in order to form larger regions with the metal fine particles 3 and achieve higher conductivity, the projections 4 each preferably have a shape giving a wide bottom to the gaps 5 between the projections 4.

The pitch P of the projections 4 may be any pitch equal to or shorter than the wavelength (780 nm) of visible light. For sufficient prevention of optical phenomena such as a moiré pattern, the pitch P is preferably in the range of 100 nm to 400 nm, more preferably in the range of 100 nm to 200 nm. The pitch P of the projections 4 as used herein refers to the average of the distances between all the adjacent projections, excluding the branched projections, within a 1-μm square region on a scanning electron microscope (SEM) photograph (plan picture) taken with a SEM (trade name: S-4700) available from Hitachi, Ltd. as a measurement device.

The height of the projections 4 may be any height that is designed to retain the metal fine particles 3 within the gaps 5 between the projections 4, and is preferably 50 nm or higher. Furthermore, for simultaneous achievement of the later-described suitable aspect ratio of the projections 4, the height of the projections 4 is preferably in the range of 50 nm to 600 nm, more preferably in the range of 100 nm to 300 nm. The height of the projections 4 as used herein refers to the average of the heights of 10 projections formed in a continuous row, excluding the branched projections, on a SEM photograph (cross-sectional picture) taken with a SEM (trade name: S-4700) available from Hitachi, Ltd. as a measurement device. Here, projections with a defect or deformation (e.g., portions deformed in preparation of a sample for SEM photographs) are excluded from the 10 projections. The sample for SEM photographs is sampled in a region without specific defects of anti-reflection films. For example, in the case of a continuously produced rolled anti-reflection film, a sample taken in the vicinity of the center of the film is used.

The aspect ratio of the projections 4 is not particularly limited, but is preferably 1.5 or smaller in terms of the processability of the moth-eye structure. If the aspect ratio of the projections 4 is too large (the projections 4 are elongated), the projections may stick to each other (sticking) or deteriorate the transfer condition for formation of the moth-eye structure (e.g., the projections may clog the female mold for the moth-eye structure or cause winding of the female mold). For sufficient prevention of optical phenomena such as a moiré pattern and achievement of favorable reflectance characteristics, the aspect ratio of the projections 4 is preferably in the range of 0.8 to 1.5 The aspect ratio of the projections 4 as used herein refers to a ratio (height/pitch P) of the height of the projections 4 to the pitch P of the projections 4 which have been determined as described above with the SEM (trade name: S-4700) available from Hitachi, Ltd. as a measurement device.

The projections 4 may be arranged in any pattern, and may be arranged randomly or regularly. For sufficient prevention of occurrence of a moiré pattern, the projections 4 are preferably arranged randomly as illustrated in FIG. 1.

In order to form the projections 4 as described above, the material of the projections 4 is preferably resin. The material of the projections 4 is more preferably a hydrophilic resin having favorable wettability. This is because the solvent for a dispersion containing the metal fine particles 3 dispersed therein to be applied to the anti-reflection film 2 in production of the transparent conductor of Embodiment 1 is typically a polar solvent such as water, ethanol, an alcohol-based solvent, or an ester-based solvent. In the case of using a hydrophobic resin as the material of the projections 4, the dispersion may not be well applied to the gaps 5 between the projections 4 due to the hydrophobicity as well as the lotus effect of the moth-eye structure.

In order to further increase the conductivity, the metal fine particles 3 are preferably particles of a metal appropriately selected from the group of metals having a low resistivity, including gold, silver, copper, platinum, and aluminum. The metal fine particles 3 are preferably particles of a metal selected from gold, silver, and copper which have a very low resistivity. The metal fine particles 3 may be particles of one kind of a metal or of multiple kinds of metals selected from the metal group. Also, an alloy of these metals may be used.

The shape of the metal fine particles 3 may be any shape such as a sphere, a pillar (fibrous shape), or an oval sphere. For efficient placement of the metal fine particles 3, the shape of the metal fine particles 3 is preferably a sphere as illustrated in FIG. 2.

The particle size of the metal fine particles 3 may be any size that is equal to or smaller than the pitch P of the projections 4. For efficient placement of the metal fine particles 3, the particle size is preferably 50 nm or smaller, more preferably 20 nm or smaller. For more efficient placement of the metal fine particles 3, the distribution of the metal fine particles 3 (distance between the metal fine particles 3) is preferably the same as the particle size. The particle size of the metal fine particles 3 as used herein refers to the average of the particle sizes of 20 metal fine particles on SEM photographs (plan picture and cross-sectional picture) taken with the SEM (trade name: S-4700) available from Hitachi, Ltd. as the measurement device. Here, metal fine particles with a defect or deformation are excluded from the 20 metal fine particles. The particle size as used herein is the maximum length of the lengths in all the directions of each of the metal fine particles 3. For example, in the case that the metal fine particles 3 are spherical, the particle size is the length corresponding to the diameter of: the particle, while in the case that the metal fine particles 3 are oval spherical, the particle size is the longest of the major axis and a diameter in the direction perpendicular to the major axis. For sufficient increase in the conductivity and sufficient reduction of a decrease in transparency (transmittance), the metal fine particles 3 are preferably placed up to a position corresponding to 50% or lower of the depth of the gaps 5 between the projections 4, more preferably up to a position corresponding to 30% to 50% of the depth of the gaps 5 between the projections 4.

The transparent conductor of Embodiment 1 can exhibit excellent conductivity with the mesh conductive portions formed by the metal fine particles 3, excellent transparency with the regions in which the metal fine particles 3 are not placed, and an excellent low-reflection property with the anti-reflection film 2 having a moth-eye structure. In addition, the transparent conductor can achieve the following effects (i) to (v).

(i) Since the metal fine particles 3 are used as a material providing conductivity, tinged reflected light due to interference of reflected light components is not produced.

(ii) Since the pitch of the meshes in the mesh conductive portions is nanometer-sized, the conductive portions do not produce a moiré pattern even when used in a display device.

(iii) Since the depths of the gaps 5 between the projections 4 are substantially the same and the amounts of the metal fine particles 3 placed are made substantially the same in all the gaps, conduction failure is less likely to occur. Even in the case that conduction failure partially occurs, the structure with a large number of meshes formed at a nanometer-sized pitch includes many alternative sites and tends not to exhibit decreased surface resistivity.

(iv) Since the metal fine particles 3 are present in the bottom portions of the gaps 5 between the projections 4, the conductive portions have high durability. For example, in the case that the transparent conductor 1a including the projections 4 having a height of 200 nm and formed at a pitch P of 200 nm is wiped with a cloth having a minimum fiber size of 400 nm, the fibers of the cloth cannot enter the caps 5 between the projections 4 and the metal fine particles 3 are not removed. Also, in the case of applying external force to the transparent conductor 1a, the external force is mainly applied to the anti-reflection film 2 and is thus prevented from affecting the conductive portions.

(v) Since the metal fine particles 3 providing the conductivity are placed in the moth-eye structure, patterning with photomasks is unnecessary. Accordingly, there is no need to concern deterioration of the quality due to unevenness generated at the joints.

Use of the transparent conductor of Embodiment 1 having excellent transparency (high transmittance) as a transparent electrode in the display field enables reduction of power consumption. Also, in the case that the transparent conductor is applied to a capacitive touch panel, for example, production of interference fringes by reflected light components from an interface can be reduced, and tinging of the electrode in the touch panel (in the case of an ITO film) can be reduced, so that a high-quality touch panel can be produced. In touch panels, electrodes are formed by patterning in some cases. In the case of using an ITO film as the electrode for such a touch panel, the ITO film having a high refractive index of about 1.9 to 2.0 exhibits a high reflectance, causing the borders between the regions with the ITO film and the regions without the ITO film to be visible. The touch panel may therefore fail to provide a clear image. In contrast, in the case of using the transparent conductor of Embodiment 1 as the electrode for a touch panel, the conductor having a moth-eye structure with low reflectivity can exhibit a reflectance of about 2 to 3% in the regions with the metal fine particles 3 and a reflectance of 0.3% or lower in the regions without the metal fine particles 3. This touch panel can make less visible the borders between the regions with the metal fine particles 3 and the regions without the metal fine particles 3.

(2) Process of Producing Transparent Conductor

Figure 3:
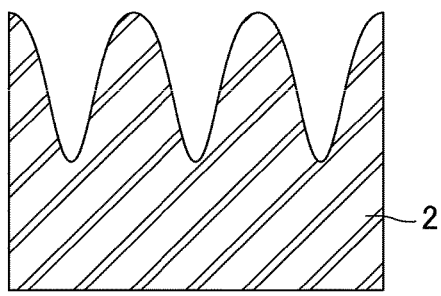
FIG. 3 includes schematic cross-sectional views for describing the process of producing the transparent conductor of Embodiment 1 (steps a to d).
Figure 3:
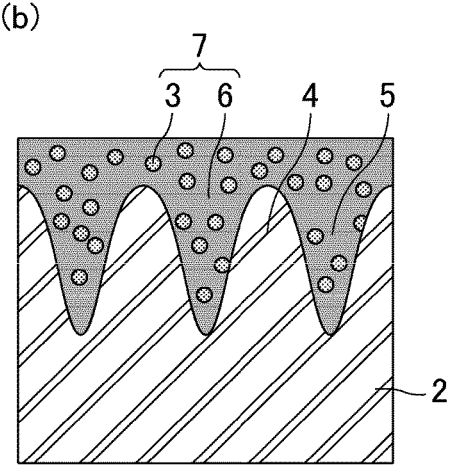
Figure 3:
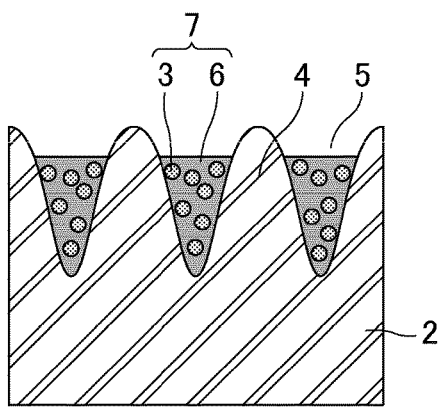
Figure 3:
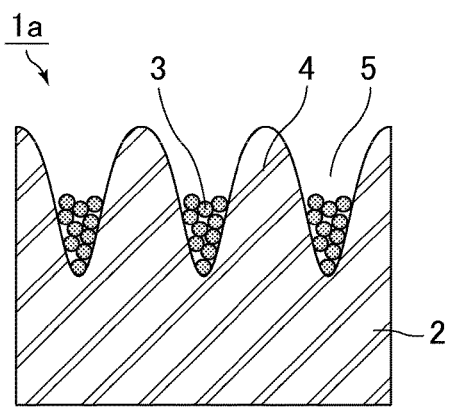

The process of producing the transparent conductor of Embodiment 1 is exemplified with reference to FIG. 3. FIG. 3 includes schematic cross-sectional views for describing the process of producing the transparent conductor of Embodiment 1 (steps a to d).

(a) Production of Anti-Reflection Film

First, a substrate is produced by sequentially forming a film of silicon dioxide (SiO2) (insulating layer) and a film of pure aluminum on an aluminum base material. At this time, using the aluminum base material having a roll shape, for example, enables continuous formation of the insulating layer and the pure aluminum layer. The pure aluminum layer formed on the surface of the substrate is then alternately repetitively anodized and etched, so that a female mold of the moth-eye structure is produced. This female mold pattern is transferred to a photo-curable resin by optical nanoimprinting, whereby an anti-reflection film 2 having a moth-eye structure as illustrated in FIG. 3(a) is produced.

(b) Application of Dispersion (Step (1))

As illustrated in FIG. 3(b), a dispersion 7 in which the metal fine particles 3 are dispersed in a solvent 6 is applied to the anti-reflection film 2. The dispersion 7 can be, for example, a dispersion (trade name: Au nanoparticle dispersion, Ag nanoparticle dispersion) available from Wako Pure Chemical Industries, Ltd. The solvent 6 can be, for example, water, ethanol, an alcohol-based solvent (e.g., methyl alcohol), or an ester-based solvent (e.g., ethyl acetate, butyl acetate). The concentration of the metal fine particles 3 in the dispersion 7 is not particularly limited, and may appropriately be set. The shape of the metal fine particles 3 may be any shape such as a sphere, a pillar (fibrous shape), or an oval sphere. For efficient placement of the metal fine particles 3, the metal fine particles 3 preferably have a spherical shape. The particle size of the metal fine particles 3 may be any size equal to or smaller than the pitch P of the projections 4. For efficient placement of the metal fine particles 3, the particle size is preferably 50 nm or smaller, more preferably 20 nm or smaller. For more efficient placement of the metal fine particles 3, the distribution of the metal fine particles 3 (distance between the metal fine particles 3) is preferably the same as the particle size. The method for applying the dispersion 7 may be any method such as a method of dropping a given amount of the dispersion in the given region of the anti-reflection film 2. The region and amount of the dispersion 7 can appropriately be adjusted in accordance with the specifications of the anti-reflection film 2 (e.g., shape of the projections 4, the depth of the gaps 5 between the projections 4).

(c) Drying (Step (2))

As illustrated in FIG. 3(c), the applied dispersion 7 is dried to evaporate the solvent 6. The method for drying the dispersion 7 may be any method such as leaving the workpiece in a clean bench. In the course of evaporation of the solvent 6, the metal fine particles 3 hardly adhere to the side surfaces of the projections 4. This is presumably because the metal fine particles 3 are energetically more advantageous when dispersed in the dispersion 7 than when adhering to the side surfaces of the projections 4 and exposed to the external air. As a result, the metal fine particles 3 accumulate in the bottom portions of the gaps 5 between the projections 4. Such drying may be performed to partially or substantially fully evaporate the solvent 6. Here, the conductivity of the transparent conductor of Embodiment 1 is not affected by the drying condition because the conductivity is provided by the metal fine particles 3 placed in the moth-eye structure.

(d) Heating (Step (3))

The dried dispersion 7 is heated (baked). As a result, as illustrated in FIG. 3(d), the residual solvent 6 volatilizes to leave the metal fine particles 3 to adhere to the bottom surfaces of the gaps 5 between the projections 4, whereby the transparent conductor 1a is completed. The method for heating the dispersion 7 may be any method such as a method of performing the heating in a typical heating furnace. Also, the above processes (b) and (c) may be alternately repeated multiple times before the heating. Such a method can lead to an increased amount of the metal fine particles 3 placed, and therefore can further increase the conductivity.

Hereinafter, examples are described in which the transparent conductor of Embodiment 1 is actually produced.

Example 1

Example 1 describes the case of using gold for the metal fine particles 3. The process of producing a transparent conductor of Example 1 is described below.

(a) Production of Anti-Reflection Film

First, a substrate was produced by sequentially forming a film of silicon dioxide ($SiO_2$) (insulating layer) and a film of pure aluminum on an aluminum base material. The pure aluminum layer formed on the surface of the substrate was then alternately repetitively anodized and etched, so that a female mold of the moth-eye structure was produced. This female mold pattern was transferred to a photo-curable resin by optical nanoimprinting, whereby the anti-reflection film 2 having a moth-eye structure was produced. The anti-reflection film 2 had the following specifications.

Shape of projections 4: bell shape
Pitch P of projections 4: 200 nm
Height of projections 4 (depth of gaps 5 between projections 4): 180 nm
Aspect ratio of projections 4: 0.9
Total thickness of anti-reflection film 2 (including height of projections 4): 6 μm (b) Application of Dispersion (Step (1))

A dispersion (trade name: Au nanoparticle dispersion) available from Wako Pure Chemical Industries, Ltd. used as the dispersion 7 was applied to the anti-reflection film 2. The solvent 6 was water. The concentration of the metal fine particles 3 (gold) was 10 mM, the particle size thereof was 20 nm (average), and the shape thereof was spherical. The dispersion 7 was applied by a method of dropping 0.5 g of the dispersion in a 30-mm square region on the anti-reflection film 2.

(c) Drying (Step (2))

The dispersion 7 was dried by a method of leaving the workpiece in a clean bench.

(d) Heating (Step (3))

The above processes (b) and (c) were alternately repeated three times, and then the dispersion 7 was heated (baked) at 120° C. for 10 minutes. The dispersion 7 was heated in a circulating clean oven available from Nagano Science Co., Ltd. Thereby, a transparent conductor of Example 1 was completed. The metal fine particles 3 (gold) were placed up to a position corresponding to 32% of the depth of the gaps 5 between the projections 4.

Example 2

A transparent conductor of Example 2 was the same as that of Example 1, except that silver was used for the metal fine particles 3. The process of producing the transparent conductor of Example 2 was the same as that in Example 1, except that the dispersion 7 used was a dispersion (trade name: Ag nanoparticle dispersion) available from Wako Pure Chemical Industries, Ltd. The solvent 6 was water. The concentration of the metal fine particles 3 (silver) was 10 mM, the particle size thereof was 20 nm (average), and the shape thereof was spherical. The metal fine particles 3 (silver) were placed up to a position corresponding to 33% of the depth of the gaps 5 between the projections 4.

Embodiment 2

Embodiment 2 relates to a transparent conductor including an anti-reflection film and metal fine particles, and is different from Embodiment 1 in that an ionic liquid is placed between the metal fine particles. Since the transparent conductor of Embodiment 2 is the same as that of Embodiment 1 except for this configuration, the same points are not described here.

(1) Structure of Transparent Conductor

Figure 4:
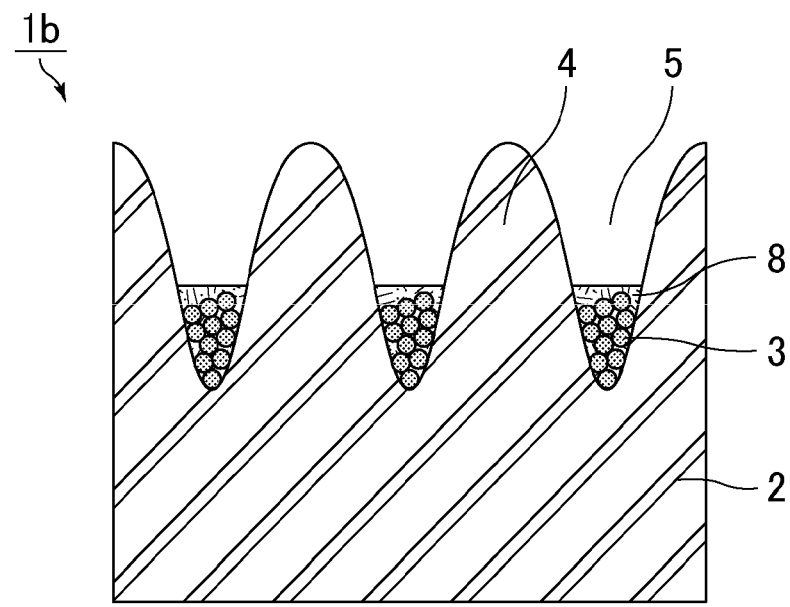
FIG. 4 is a schematic cross-sectional view of a transparent conductor of Embodiment 2.

The structure of the transparent conductor of Embodiment 2 is described with reference to FIG. 4. FIG. 4 is a schematic cross-sectional view of a transparent conductor of Embodiment 2. As illustrated in FIG. 4, a transparent conductor 1b includes the anti-reflection film 2, the metal fine particles 3, and an ionic liquid 8. The ionic liquid 8 is placed between the metal fine particles 3. The schematic plan view of the transparent conductor of Embodiment 2 is the same as FIG. 1, except that the ionic liquid 8 is placed.

The ionic liquid 8 is not particularly limited, and may be, for example, a hydrophilic or hydrophobic material. Examples of the hydrophilic material include N,N-diethyl-N-methyl-N-(2-methoxyethyl)ammonium tetrafluoroborate, 1-ethyl-3-methylimidazolium trifluoromethanesulfonate ([EMIM][CF3SO3]), 1-butyl-3-methylimidazolium trifluoromethanesulfonate ([BMIM][CF3SO3]), and 1-butyl-3-methylimidazolium chloride ([BMIM][Cl]). These compounds are widely available from companies including Wako Pure Chemical Industries, Ltd., Kanto Chemical Co., Inc., and Sigma-Aldrich Co. LLC. The term hydrophilic as used herein means being soluble in water. Examples of the hydrophobic material include N,N-diethyl-N-methyl-N-(2-methoxyethyl)ammonium bis(trifluoromethanesulfonyl)imide, 1-butyl-3-methylimidazolium hexafluorophosphate ([BMIM][PF6]), and 1-butyl-3-methylimidazolium bis(trifluoroethanesulfonyl)imide ([BMIM][NTf2]). These compounds are widely available from companies including Wako Pure Chemical Industries, Ltd., Kanto Chemical Co., Inc., and Sigma-Aldrich Co. LLC. The term hydrophobic as used herein means being insoluble in water. The ionic liquid 8 has a vapor pressure of almost 0, and therefore is not lost even when left in the conductor.

It is clear that the transparent conductor of Embodiment 2 can achieve the same effects as those of Embodiment 1. Also, the transparent conductor of Embodiment 2, including the ionic liquid 8 between the metal fine particles 3, can give a low contact resistivity between the metal fine particles 3 to lower the resistivity of all the conductive portions. As a result, the transparent conductor can exhibit further increased conductivity. In addition, since the ionic liquid 8 is placed in the bottom portions of the gaps 5 between the projections 4, stains are less likely to reach the bottom portions and can be repelled on the surface of the ionic liquid 8.

(2) Process of Producing Transparent Conductor

The process of producing the transparent conductor of Embodiment 2 is the same as that in Embodiment 1, except that the metal fine particles 3 were impregnated with the ionic liquid 8 after the transparent conductor of Embodiment 1 illustrated in FIG. 3(*d*) was completed.

Hereinafter, an example is described in which the transparent conductor f Embodiment 2 was actually produced.

Example 3

A transparent conductor of Example 3 was the same as that of Example 1, except that the ionic liquid 8 was placed between the metal fine particles 3. Also, the process of producing the transparent conductor of Example 3 was the same as that in Example 1, except that the metal fine particles 3 were impregnated with the ionic liquid 8 after the transparent conductor of Example 1 was completed. The ionic liquid 8 used was a hydrophilic ionic liquid (trade name: N,N-diethyl-N-methyl-N-(2-methoxyethyl)ammonium tetrafluoroborate) available from Kanto Chemical. Co., Inc.

Embodiment 3

Embodiment 3 relates to a transparent conductor including an anti-reflection film and metal fine particles, and is different from Embodiment 1 in that the ionic liquid is placed up to top portions of the gaps between the projections of the anti-reflection film. Since the transparent conductor of Embodiment 3 is the same as that of Embodiment 1 except for this configuration, the same points are not described here.

(1) Structure of Transparent Conductor

Figure 5:
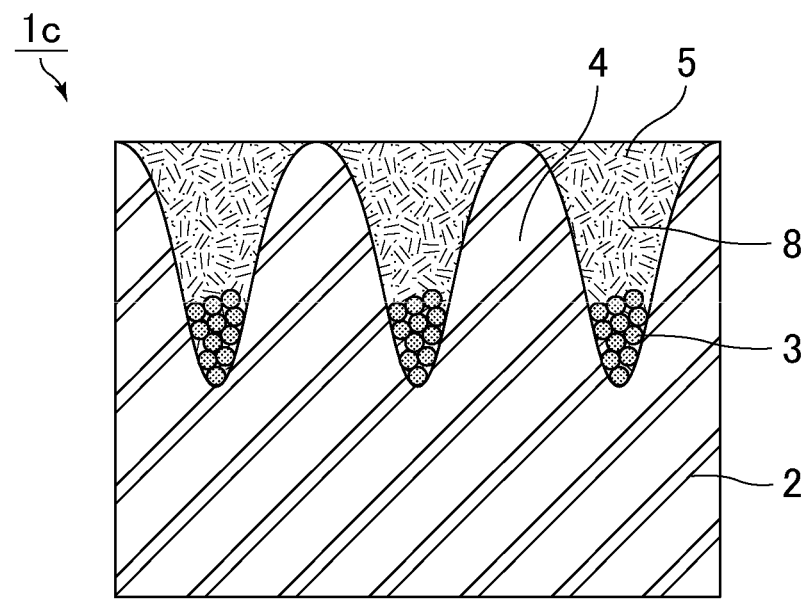
FIG. 5 is a schematic cross-sectional view of a transparent conductor of Embodiment 3.

The structure of the transparent conductor of Embodiment 3 is described with reference to FIG. 5. FIG. 5 is a schematic cross-sectional view of a transparent conductor of Embodiment 3. As illustrated in FIG. 5, a transparent conductor 1*c* includes the anti-reflection film 2, the metal fine particles 3, and the ionic liquid 8. The ionic liquid 8 is placed up to the top portions of the gaps 5 between the projections 4. The top portions of the gaps 5 between the projections 4 as used herein mean the positions in the range of higher than 50% to 100% of the depth of the gaps 5 between the projections 4. The schematic plan view of the transparent conductor of Embodiment 3 is the same as FIG. 1, except for the placement of the ionic liquid 8.

The ionic liquid 8 is not particularly limited, and may be the same as that in. Embodiment 2. Since the amount of the ionic liquid 8 placed in the transparent conductor of Embodiment 3 is large, the ionic liquid 8 may flow out under the effect of gravity, for example in order to prevent the ionic liquid 8 from flowing out, the pitch P of the projections 4 is preferably designed to be 100 nm or shorter, for example, though the preferred pitch may depend on the combination of the materials of the projections 4 and the ionic liquid 8.

It is clear that the transparent conductor of Embodiment 3 can achieve the same effects as those of Embodiment 1. Also, the transparent conductor of Embodiment 3, including the ionic liquid 8 between the metal fine particles 3, can give a low contact resistivity between the metal fine particles 3 to lower the resistivity of all the conductive portions. As a result, the transparent conductor can exhibit further increased conductivity. In addition, since the ionic liquid 8 is a transparent substance, the decrease in the transparency (transmittance) of the transparent conductor can be kept at the minimum even when the amount of the ionic liquid is increased. Moreover, in the case that the ionic liquid 8 is a hydrophilic material, the transparent conductor can exhibit excellent anti-fouling properties against hydrophobic stains. In the case that the ionic liquid 8 is a hydrophobic material, the transparent conductor can exhibit excellent anti-fouling properties against hydrophilic stains.

(2) Process of Producing Transparent Conductor

The process of producing the transparent conductor of Embodiment 3 is the same as that in Embodiment 1, except that the ionic liquid 8 was placed up to the top portions of the gaps 5 between the projections 4 after the transparent conductor of Embodiment 1 illustrated in FIG. 3(*d*) was completed.

Hereinafter, an example is described in which the transparent conductor of Embodiment 3 was actually produced.

Example 4

A transparent conductor of Example 4 was the same as that of Example 1, except that the ionic liquid 8 was placed up to the top portions of the gaps 5 between the projections 4 of the anti-reflection film 2. Also, the process of producing the transparent conductor of Example 4 was the same as that in Example 1, except that the ionic liquid 8 was placed up to the top portions of the gaps 5 between the projections 4 after the transparent conductor of Example 1 was completed. The ionic liquid 8 used was a hydrophobic ionic liquid trade name: N,N-diethyl-N-methyl-N-(2-methoxyethyl)ammonium bis(trifluoromethanesulfonyl)imide) available from Kanto Chemical Co., Inc. The ionic liquid 8 was placed up to a position corresponding to 100% of the depth of the gaps 5 between the projections 4.

Embodiment 4

Embodiment 4 relates to a transparent conductor including an anti-reflection film and metal fine particles, and is different from Embodiment 1 in that the metal fine particles are each covered with a metal thin film. Since the transparent conductor of Embodiment 4 is the same as that in Embodiment 1 except for this configuration, the same points are not described here.

(1) Structure of Transparent Conductor

Figure 6:
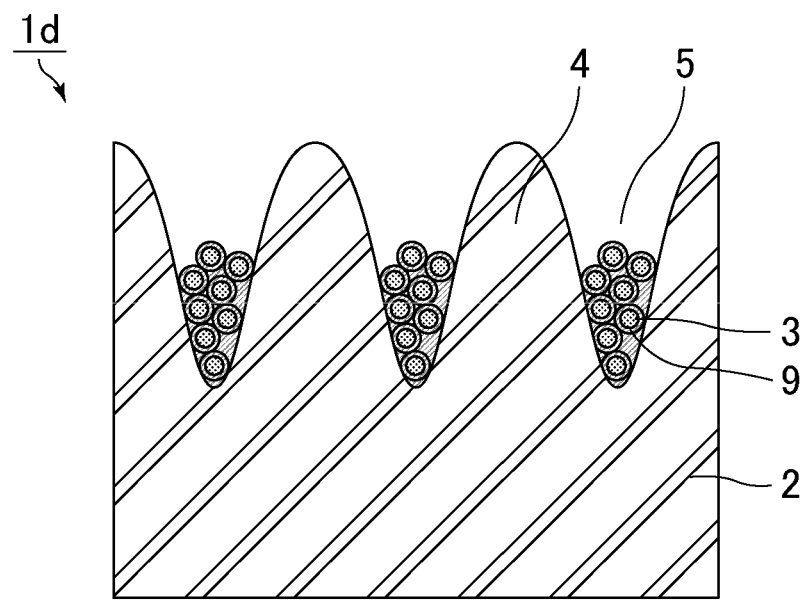
FIG. 6 is a schematic cross-sectional view of a transparent conductor of Embodiment 4.

The structure of the transparent conductor of Embodiment 4 is described with reference to FIG. 6. FIG. 6 is a schematic cross-sectional view of a transparent conductor of Embodiment 4. As illustrated in FIG. 6, a transparent conductor 1d includes the anti-reflection film 2 and the metal fine particles 3. The metal fine particles 3 are each covered with a metal thin film 9, meaning that the particles are metal-plated particles. The schematic plan view of the transparent conductor of Embodiment 4 is the same as FIG. 1, except that the metal thin film 9 is formed.

The metal thin film (metal plating) 9 may be formed by any metal having lower ionization tendency than the metal fine particles 3. For example, in the case of using aluminum, zinc, iron, or nickel for the metal fine particles 3, the metal thin film 9 can be formed by silver or gold. Also, in the case of using silver for the metal fine particles 3, for example, the metal thin film 9 can be formed by gold.

It is clear that the transparent conductor of Embodiment 4 can achieve the same effects as those in Embodiment 1. Also, the transparent conductor of Embodiment 4, including the metal fine particles 3 each covered with the metal thin film 9, can exhibit further increased conductivity and lead to more efficient accumulation and adhesion of the metal fine particles 3. Also, such a transparent conductor can exhibit increased conductivity without an expensive material such as gold or silver for the metal fine particles 3, and thus enables reduction of the cost.

(2) Process of Producing Transparent Conductor

The process of producing the transparent conductor of Embodiment 4 is the same as that in Embodiment 1, except that the metal fine particles 3 are each covered with a thin film of a metal (metal thin film 9) having lower ionization tendency than the metal fine particles 3 after the transparent conductor of Embodiment 1 illustrated in FIG. 3(d) is completed. The method for covering the metal fine particles 3 with the metal thin film 9 is not particularly limited, and may be, for example, immersing the metal fine particles 3 in an electroless plating bath, and covering the metal fine particles 3 with the metal thin film 9 by displacement chemical plating. In the displacement chemical plating, the metal fine particles 3 release electrons when they dissolve, and the metal ions in the electroless plating bath receive the electrons to be reduced to a metal and then precipitated. The precipitates cover the surfaces of the metal fine particles 3. The electroless plating is preferably displacement chemical plating which allows wide selection of materials and thin plating of the particles.

(Evaluation Results)

The results of evaluating the sheet resistivity, transmittance, reflectance, reflected color, and production of a moiré pattern in the transparent conductors of Examples 1 to 3 are shown in Table 1. The same evaluation was performed also on a transparent conductor of Comparative Example 1 produced by the method described in Example 12 in Patent Literature 8. The same evaluation was also performed on a configuration of Comparative Example 2 in which a 120-nm-thick ITO film was formed on the entire surface of an 80-μm-thick polyethylene terephthalate (PET) film.

The sheet resistivity was measured with a resistivity meter (trade name: Loresta-GP MCP-T610) available from Mitsubishi Chemical Analytech Co., Ltd.

The transmittance was measured with a luminance meter (trade name: BM-9A) available from Topcon Technohouse Corporation. The transmittance as used herein refers to the visible light transmittance which is a fraction of the incident visible light that is transmitted.

The reflectance was measured with a spectrophotometer (trade name: V-560) available from JASCO Corporation.

The reflectance as used herein refers to the visible light reflectance which is a fraction of the incident visible light that is reflected.

The reflected color was evaluated by three observers. They observed the fluorescent light reflected on each sample, and evaluated the color of the light.

The moiré pattern was evaluated by three observers. They observed a green image displayed to the entire screen of a 60-inch liquid crystal display device (trade name: Aguos LX9 FHD) available from Sharp Corporation, with each sample mounted on the front surface of the device. They evaluated whether or not they perceived a moiré pattern.

TABLE 1

|  | Sheet resistivity ($\Omega/\square$) | Transmittance (%) | Reflectance (%) | Reflected color | moiré |
|---|---|---|---|---|---|
| Example 1 | 40 | 87.5 | 2.5 | Neutral | None |
| Example 2 | 30 | 84.5 | 2.0 | Neutral | None |
| Example 3 | 20 | 82.6 | 3.4 | Neutral | None |
| Comparative Example 1 | 10 | 85.0 | 4.0 | Neutral | None |
| Comparative Example 2 | 26 | 82.0 | 6.0 | Pale yellow | None |

As shown in Table 1, in all of Examples 1 to 3, the sheet resistivity was at about the same or lower level than that in Comparative Example 2. In particular, the transparent conductor of Example 3 exhibited a lower sheet resistivity than those of Examples 1 and 2, and was therefore evaluated as having better conductivity.

As shown in Table 1, in all of Examples 1 to 3, the ti transmittance was higher than that in Comparative Example 2. In particular, the transparent conductor of Example 1 exhibited a higher transmittance than those of Examples 2 and 3, and was therefore evaluated as having better transparency.

As shown in Table 1, in all of Examples 1 to 3, the reflectance was lower than those in Comparative Examples 1 and 2. In particular, the transparent conductor of Example 2 exhibited a lower reflectance than those of Examples 1 and 3, and was therefore evaluated as having a better low-reflection property. The reflectance in Example 3 was higher than those in Examples 1 and 2, which is presumably due to the ionic liquid.

As shown in Table 1, in all of Examples 1 to 3, the reflected light was not tinged (neutral). In all of Examples 1 to 3, no moiré pattern was perceived.

Embodiment 5

Figure 7:
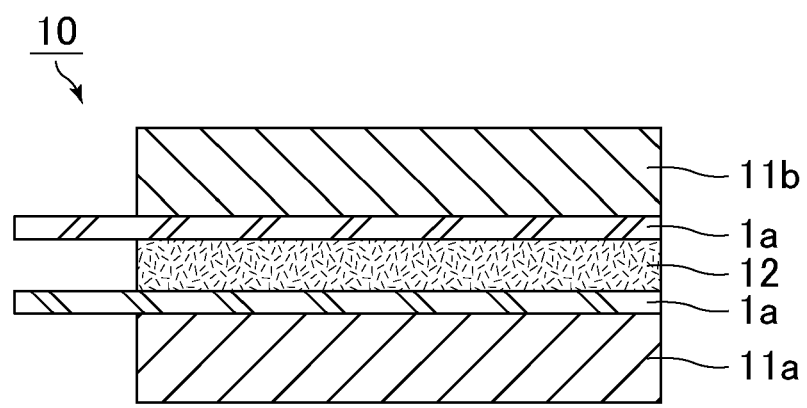
FIG. 7 is a schematic cross-sectional view of a touch panel of Embodiment 5.
Figure 8:
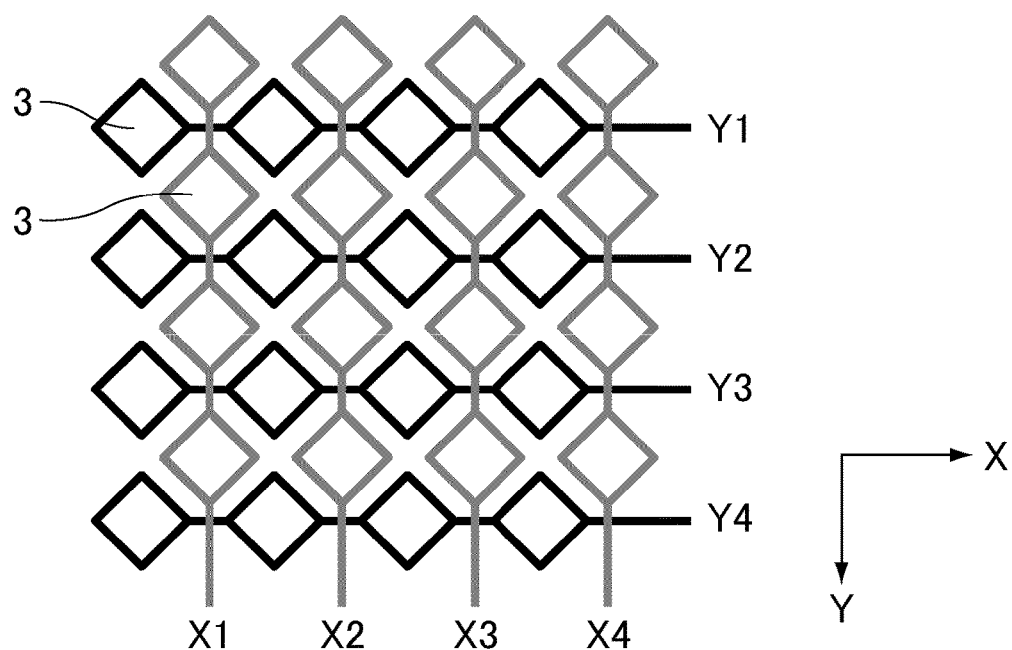
FIG. 8 is a schematic plan view of two transparent conductors illustrated in FIG. 7.

Embodiment 5 relates to a touch panel including the transparent conductor of any one of Embodiments 1 to 4. Hereinafter, the case of applying the transparent conductor of Embodiment 1 to a projection-type capacitive touch panel is described with reference to FIG. 7 and FIG. 8. FIG. 7 is a schematic cross-sectional view of a touch panel of Embodiment 5. FIG. 8 is a schematic plan view of two transparent conductors illustrated in FIG. 7. As illustrated in FIG. 7, a touch panel 10 includes glass substrates 11a and 11b that face each other and are attached to each other by an adhesive 12. The transparent conductor 1a of Embodiment 1 is disposed on the adhesive 12 side surface of each of the glass substrates 11a and 11b. Here, the two transparent conductors 1a are disposed with their projections facing each other. The adhesive 12 may be, for example, an optical clear adhesive (OCA) sheet. The touch panel 10 may include a cover lens on the side of the glass substrate 11b opposite to the adhesive 12, with an adhesive in between. The touch panel 10 can be mounted on the viewer side of a liquid crystal display device. Hereinafter, the transparent conductor 1a disposed on the glass substrate 11a side is also referred to as an X electrode, and the transparent conductor 1a disposed on the glass substrate 11b side is also referred to as a Y electrode.

FIG. 8 is a schematic plan view focusing on the X electrode and the Y electrode in FIG. 7. As illustrated in FIG. 8, the X electrode includes conductive portions arranged in a pattern in the X direction (transverse direction), and the Y electrode includes conductive portions arranged in a pattern in the Y direction (vertical direction). When the touch panel 10 having such a configuration is touched with the finger, for example, a change in the capacitance nearby between the electrodes is detected by the electrode lines in the X direction (e.g., line X1, line X2, line X3, line X4) and the electrode lines in the Y direction (line Y1, line Y2, line Y3, line Y4), so that the position touched with the finger can be identified. Here, the pattern of the electrode lines in a microscopic view is arrangement of the mesh conductive portions in one direction (X direction or Y direction). Examples of the method of forming the X electrode and the Y electrode formed by such electrode lines include a method utilizing a transparent conductor in which mesh conductive portions are arranged in lines at intervals, and a method of arranging transparent conductors including mesh conductive portions on the entire surface in lines at intervals.

In a conventional touch panel, transparent electrodes such as ITO films are used in place of the transparent conductors 1a (X electrode and Y electrode) illustrated in FIG. 7, and the films are patterned as illustrated in FIG. 8. The ITO films, however, have a high refractive index of about 1.9 to 2.0 which is greatly different from the refractive index (about 1.5) of the adhesive. This difference may produce strong reflected light from the interface to allow the ITO film pattern to be visible. In contrast, in the touch panel of Embodiment 5, the light-transmitting regions of the X electrode and the Y electrode (the regions without the conductive portions) are mainly formed from a resin. Here, a material exhibiting a refractive index of about 1.5 in the region can be selected. Accordingly, unnecessary reflected light can be reduced at the interfaces of the X electrode and the Y electrode with the adhesive 12, making the pattern of the conductive portions less visible.

Hereinabove, the case of applying the transparent conductor of Embodiment 1 to a touch panel has been described. The same description can also be applied to the case of applying the transparent conductor of any one of Embodiments 2 to 4 to a touch panel. From the viewpoint of handleability, the transparent conductor (dry type) of Embodiment 1 is preferably applied. Also, the conductor may be applied to a touch panel of any other mode.

Additional Remarks

Hereinafter, examples of preferred modes of the transparent conductor of the present invention are described. The modes may appropriately be combined within the spirit of the present invention.

The transparent conductor may further include an ionic liquid placed between the metal fine particles. Such a transparent conductor gives a low contact resistivity between the metal fine particles to lower the resistivity of all the conductive portions. As a result, the transparent conductor can exhibit further increased conductivity. In addition, since the ionic liquid is placed in the bottom portions of the gaps between the projections, stains can be repelled on the surface of the ionic liquid. The ionic liquid may be a hydrophilic material or a hydrophobic material.

The ionic liquid may be placed up to the top portions of the gaps between the projections. The ionic liquid may be a hydrophilic material. In this case, the transparent conductor can exhibit further increased conductivity and excellent anti-fouling properties against hydrophobic stains. The ionic liquid may also be a hydrophobic material. In this case, the transparent conductor can exhibit further increased conductivity and excellent anti-fouling properties against hydrophilic stains.

The pitch of the projections may be 100 nm or shorter. This configuration can effectively prevent the ionic liquid from flowing out of the gaps between the projections even when the amount of the ionic liquid placed is large.

The metal fine particles may be covered with a thin film of a metal having lower ionization tendency than the metal fine particles. Such a transparent conductor can exhibit further increased conductivity and lead to more efficient accumulation and adhesion of the metal fine particles. Also, such a transparent conductor can exhibit increased conductivity without an expensive material such as gold or silver for the metal fine particles, and thus enables reduction of the cost.

The metal fine particles may have a particle size of 50 nm or smaller. This configuration enables efficient placement of the metal fine particles in the bottom portions of the gaps between the projections.

The projections may have an aspect ratio in the range of 0.8 to 1.5. This configuration enables sufficient prevention of optical phenomena such as a moiré pattern to achieve favorable reflectance characteristics.

Hereinafter, examples of preferred modes of the method for producing the transparent conductor of the present invention are described. These examples may appropriately be combined within the spirit of the present invention.

In the method for producing the transparent conductor, the steps (1) and (2) may be alternately repeated multiple times before the step (3). This method enables efficient increase in the amount of the metal fine particles to be placed, thereby further increasing the conductivity of the transparent conductor.

The method for producing the transparent conductor may further include a step (4) of covering the metal fine particles with a thin film of a metal having lower ionization tendency than the metal fine particles, after the step (3). Such a method can further increase the conductivity of the transparent conductor and lead to more efficient accumulation and adhesion of the metal fine particles. Also, such a method can increase the conductivity of the transparent conductor without an expensive material such as gold or silver for the metal fine particles, and thus efficiently produce the transparent conductor at a reduced cost.

REFERENCE SIGNS LIST 1a, 1b, 1c, 1d: transparent conductor
2: anti-reflection film
3: metal fine particles
4: projection
5: gap between projections
6: solvent
7: dispersion
8: ionic liquid
9: metal thin film (metal plating)
10: touch panel
11a, 11b: glass substrate 12: adhesive
13: branched projection
2: pitch

The invention claimed is:

1. A transparent conductor comprising:
   an anti-reflection film provided on a surface with projections formed at a pitch equal to or shorter than the wavelength of visible light; and
   metal fine particles each having a particle size equal to or smaller than the pitch of the projections and being placed in bottom portions of gaps between the projections,
   the metal fine particles placed in the gaps between the projections being each covered with a thin metal film and constituting mesh conductive portions.

2. The transparent conductor according to claim 1, further comprising
   an ionic liquid placed between the metal fine particles.

3. The transparent conductor according to claim 2,
   wherein the ionic liquid is placed up to top portions of the gaps between the projections.

4. The transparent conductor according to claim 2,
   wherein the ionic liquid is a hydrophilic material.

5. The transparent conductor according to claim 2,
   wherein the ionic liquid is a hydrophobic material.

6. The transparent conductor according to claim 3,
   wherein the pitch of the projections is 100 nm or shorter.

7. The transparent conductor according to claim 1,
   wherein the metal fine particles have a particle size of 50 nm or smaller.

8. The transparent conductor according to claim 1,
   wherein the projections have an aspect ratio in the range of 0.8 to 1.5.

9. A method for producing the transparent conductor according to claim 1, comprising the steps of:
   (1) applying a dispersion with the metal fine particles dispersed in a solvent to the anti-reflection film;
   (2) drying the applied dispersion to evaporate the solvent; and
   (3) heating the dried dispersion.

10. The method for producing a transparent conductor according to claim 9,
    wherein the steps (1) and (2) are alternately repeated multiple times before the step (3).

11. A touch panel comprising
    the transparent conductor according to claim 1.

12. The transparent conductor according to claim 4,
    wherein the pitch of the projections is 100 nm or shorter.

13. The transparent conductor according to claim 5,
    wherein the pitch of the projections is 100 nm or shorter.

14. The transparent conductor according to claim 1,
    wherein the metal thin film includes a metal having a lower ionization tendency than the metal fine particles.

15. The method for producing a transparent conductor according to claim 9, further comprising, after the step (3), the step of
    (4) immersing the metal fine particles in an electroless plating bath, and covering the metal fine particles with the metal thin film by displacement chemical plating.

* * * * *